United States Patent
Furui

(10) Patent No.: US 9,479,748 B2
(45) Date of Patent: Oct. 25, 2016

(54) PROJECTOR AND CONTROL METHOD FOR THE PROJECTOR

(71) Applicant: SEIKO EPSON CORPORATION, Tokyo (JP)

(72) Inventor: Shiki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 73 days.

(21) Appl. No.: 14/378,151

(22) PCT Filed: Mar. 13, 2013

(86) PCT No.: PCT/JP2013/001655
§ 371 (c)(1),
(2) Date: Aug. 12, 2014

(87) PCT Pub. No.: WO2013/136789
PCT Pub. Date: Sep. 19, 2013

(65) Prior Publication Data
US 2015/0015852 A1    Jan. 15, 2015

(30) Foreign Application Priority Data
Mar. 14, 2012 (JP) .................. 2012-056949

(51) Int. Cl.
*H04N 9/31* (2006.01)

(52) U.S. Cl.
CPC .......... *H04N 9/3185* (2013.01); *H04N 9/3194* (2013.01)

(58) Field of Classification Search
CPC .. G03B 21/26; H04N 9/3185; H04N 9/3194; H04N 13/0425; H04N 13/0459
See application file for complete search history.

(56) References Cited

U.S. PATENT DOCUMENTS

| | | | | |
|---|---|---|---|---|
| 6,422,704 | B1* | 7/2002 | Gyoten | H04N 9/317 348/745 |
| 2005/0213846 | A1* | 9/2005 | Matsuda | G03B 21/14 382/275 |
| 2006/0038962 | A1* | 2/2006 | Matsumoto | G06T 3/0006 353/69 |
| 2006/0170877 | A1* | 8/2006 | Kamiya | G03B 21/14 353/69 |
| 2007/0274588 | A1* | 11/2007 | Jeong | H04N 9/3194 382/181 |
| 2008/0284987 | A1* | 11/2008 | Yonezawa | G03B 21/00 353/70 |
| 2010/0128231 | A1 | 5/2010 | Furui | |

FOREIGN PATENT DOCUMENTS

| | | |
|---|---|---|
| EP | 1 560 429 A2 | 8/2005 |
| JP | 2010130225 A | 6/2010 |
| JP | A-2010-128102 | 6/2010 |

OTHER PUBLICATIONS

Jul. 8, 2013 International Search Report issued in International Application No. PCT/JP2013/001655.

* cited by examiner

Primary Examiner — Sultan Chowdhury
(74) Attorney, Agent, or Firm — Oliff PLC

(57) ABSTRACT

A projector includes a projecting unit configured to project an image on a projection surface, a projection control unit configured to cause the projecting unit to project a correction pattern including a first pattern and a second pattern, and a correction control unit configured to detect the first pattern and the second pattern included in the projected correction pattern and correct distortion of the projected image. The correction control unit detects the second pattern projected on a screen and detects the position of the first pattern on the basis of the position of the detected second pattern.

7 Claims, 10 Drawing Sheets

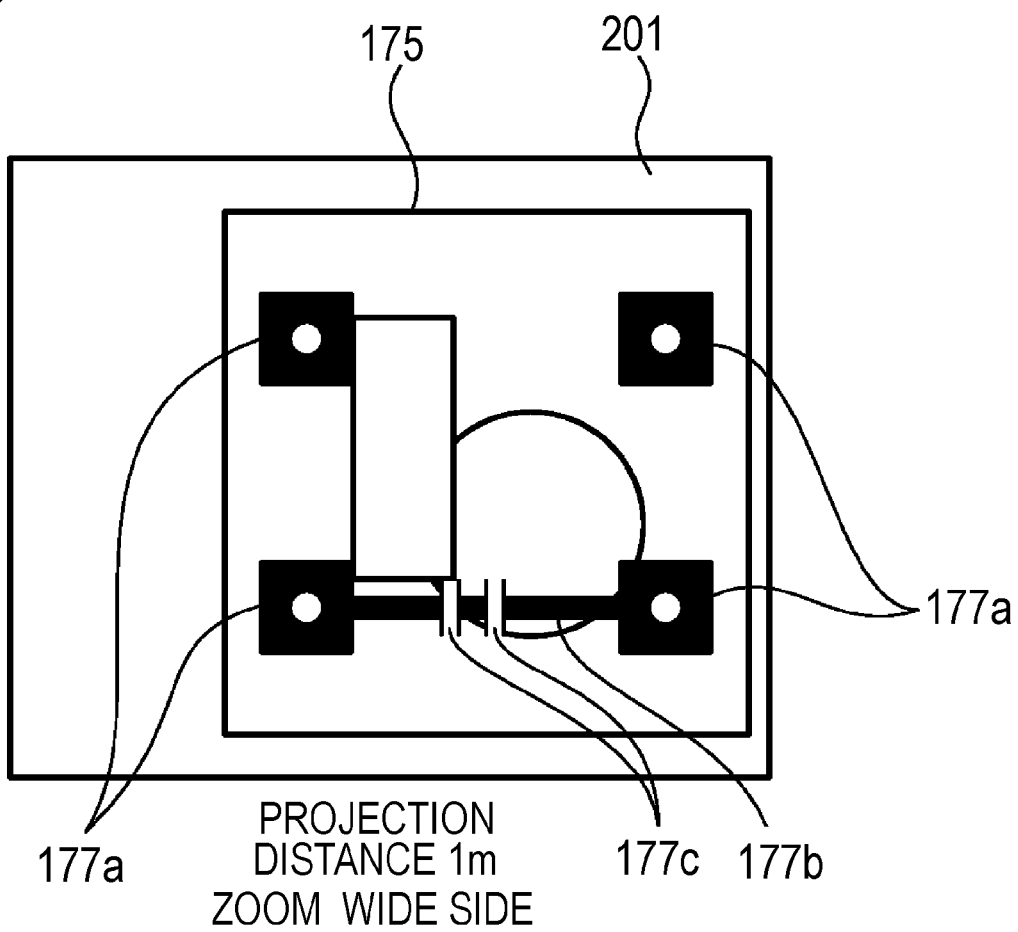

PROJECTOR AND CONTROL METHOD FOR THE PROJECTOR

CROSS REFERENCE TO RELATED APPLICATIONS

The entire disclosure of Japanese Patent Application No. 2012-056949, filed Mar. 14, 2012 is expressly incorporated by reference herein.

TECHNICAL FIELD

The present invention relates to a projector that projects an image on a projection surface and a control method for the projector.

BACKGROUND ART

There has been known a projector that projects an image on a projection surface, the projector including a function of correcting trapezoidal distortion of the projected image (see, for example, PLT 1). The projector of this type projects an image for adjustment for correcting an image, photographs the projection surface, and detects a configuration image from a photographed image to perform distortion correction. Such an image for adjustment is formed by, for example, a plurality of white measuring points and straight lines. In processing for correcting distortion, the projector calculates an angle and a distance of the projector with respect to the projection surface on the basis of the positions of the measurement points and the straight lines in the photographed image.

CITATION LIST

Patent Literature

[PTL 1]
JP-A-2010-128102

SUMMARY OF INVENTION

Technical Problem

Incidentally, the position of the image for adjustment on the projection surface changes because of the influence of, for example, a zoom ratio of the projector. Therefore, in a state in which a positional relation between the projection surface and the projector is unknown, it is unknown where on the projection surface the image for adjustment is located. Therefore, the projector in the past searches the entire projection surface for the image for adjustment. As a result, the search is a time-consuming process. Therefore, there is a demand for a method of surely detecting, in a short time, the image for adjustment projected on the projection surface.

Solution to Problem

An advantage of some aspects of the invention is to enable a projector, which projects an image for adjustment on a projection surface and performs processing such as correction on the basis of the image for adjustment, to promptly and surely detect the image for adjustment on the projection surface. An aspect of the invention is directed to a projector including: a projecting unit configured to project an image on a projection surface; a control unit configured to cause the projecting unit to project an image for adjustment including a first pattern and a second pattern; and a correcting unit configured to detect the first pattern and the second pattern included in the image for adjustment projected by the projecting unit and correct distortion of the projected image. The correcting unit detects the second pattern projected on the projection surface and detects the position of the first pattern on the basis of the position of the detected second pattern.

According to the aspect of the invention, by detecting the second pattern included in the image for adjustment, it is possible to detect the position of the first pattern on the basis of the position of the second pattern. Therefore, the first pattern is not required to be formed in a position and a shape for easily detecting the first pattern. Therefore, for example, if the second pattern arranged to be easily detected and the first pattern suitable for the distortion correction of the projected image are used, it is possible to promptly detect the image for adjustment and quickly and highly accurately correct the image. In other words, irrespective of the shape of the first pattern used for the correction, the projector can promptly detect the image for adjustment.

In the projector of the aspect of the invention, the projecting unit may include a projection lens. The second pattern may be arranged to be projected in the vicinity of an intersection point of an optical axis of the projection lens and the projection surface.

According to this configuration, since the second pattern included in the image for adjustment is arranged to be less easily affected by a zoom ratio of the projector, it is possible to estimate the position of the second pattern irrespective of a positional relation between the projector and the projection surface. Therefore, the projector can promptly detect the second pattern in a state in which the image for adjustment is projected and can promptly detect the first pattern by performing estimation based on the position of the second pattern.

In the projector of the aspect of the invention, at least a part of the second pattern may include a plurality of parallel lines colored in white or a color having high luminance compared with a color of an image projected as a background of the image for adjustment.

According to this configuration, it is possible to more promptly detect the second pattern included in the image for adjustment.

The projector of the aspect of the invention may include an image pickup unit configured to photograph the projection surface. The correcting unit may detect the first pattern from a photographed image of the image pickup unit and correct the distortion of the projected image.

According to this configuration, it is possible to promptly detect the first pattern from the photographed image obtained by photographing the projection surface and correct the image.

In the projector of the aspect of the invention, the image for adjustment may include, as the second pattern, a straight line arranged to be reflected on an epipolar line in a projecting direction of the image for adjustment or in the vicinity of the epipolar line on the photographed image of the image pickup unit.

According to this configuration, the second pattern located on the epipolar line or in the vicinity of the epipolar line is less easily affected by the zoom ratio of the projector. The second pattern is located in substantially the same positions on photographed images and can be easily detected. Therefore, it is possible to more promptly detect the second pattern.

In the projector of the aspect of the invention, the image for adjustment may include, as the second pattern, a figure having a predetermined shape arranged to be reflected on an epipolar line in a projecting direction of the image for adjustment or in the vicinity of the epipolar line on the photographed image of the image pickup unit.

According to this configuration, since the second pattern is located in substantially the same positions on photographed image irrespective of the zoom ratio, it is possible to more promptly detect the second pattern.

In the projector of the aspect of the invention, the image for adjustment may include, as the second pattern, a predetermined figure configured to be reflected in the vicinity of the optical axis of the projection lens on the photographed image of the image pickup unit.

According to this configuration, since the second pattern is located in substantially the same positions on photographed images, it is possible to more promptly detect the second pattern.

In the projector of the aspect of the invention, the correcting unit may execute, a plurality of times, processing for correcting the distortion of the projected image until a predetermined completion condition is met after a start condition for the processing for correcting the distortion of the projected image holds.

According to this configuration, it is possible to execute, a plurality of times, the processing for correcting the distortion of the projected image until the predetermined completion condition is met after the start condition for the processing for correcting the distortion of the projected image holds and promptly and surely execute the processing for detecting the image for adjustment in the processing. Therefore, it is possible to reduce time required for the processing for correcting the distortion and a load of the processing and, for example, execute the processing a large number of times at a short period. Further, it is possible to prevent a wait time due to the plural times of the execution of the processing from occurring and realize improvement of convenience of a user.

Another aspect of the invention is directed to a control method for a projector including: controlling a projector including a projecting unit configured to project an image on a projection surface; projecting, with the projecting unit, an image for adjustment including a first pattern and a second pattern; detecting the first pattern and the second pattern included in the image for adjustment projected by the projecting unit and correcting distortion of the projected image; and detecting the second pattern projected on the projection surface and detecting the position of the first pattern on the basis of the position of the detected second pattern.

According to this aspect of the invention, since the second pattern included in the image for adjustment is detected, it is possible to detect the position of the first pattern on the basis of the position of the second pattern. Therefore, for example, if the second pattern arranged to be easily detected and the first pattern suitable for the distortion correction of the projected image are used, it is possible to promptly detect the image for adjustment and quickly and highly accurately correct the image. In other words, irrespective of the shape of the first pattern used for the correction, the projector can promptly detect the image for adjustment.

Advantageous Effects of Invention

According to the aspects of the invention, it is possible to promptly and surely detect the image for adjustment.

BRIEF DESCRIPTION OF DRAWINGS

FIG. 4C is an explanatory diagram showing a relation between a zoom ratio of the projector and the photographed image, and showing examples of the photographed image obtained when a projection distance and the zoom ratio are variously changed.

DESCRIPTION OF EMBODIMENTS

An embodiment to which the invention is applied is explained below with reference to the drawings.

Figure 1:
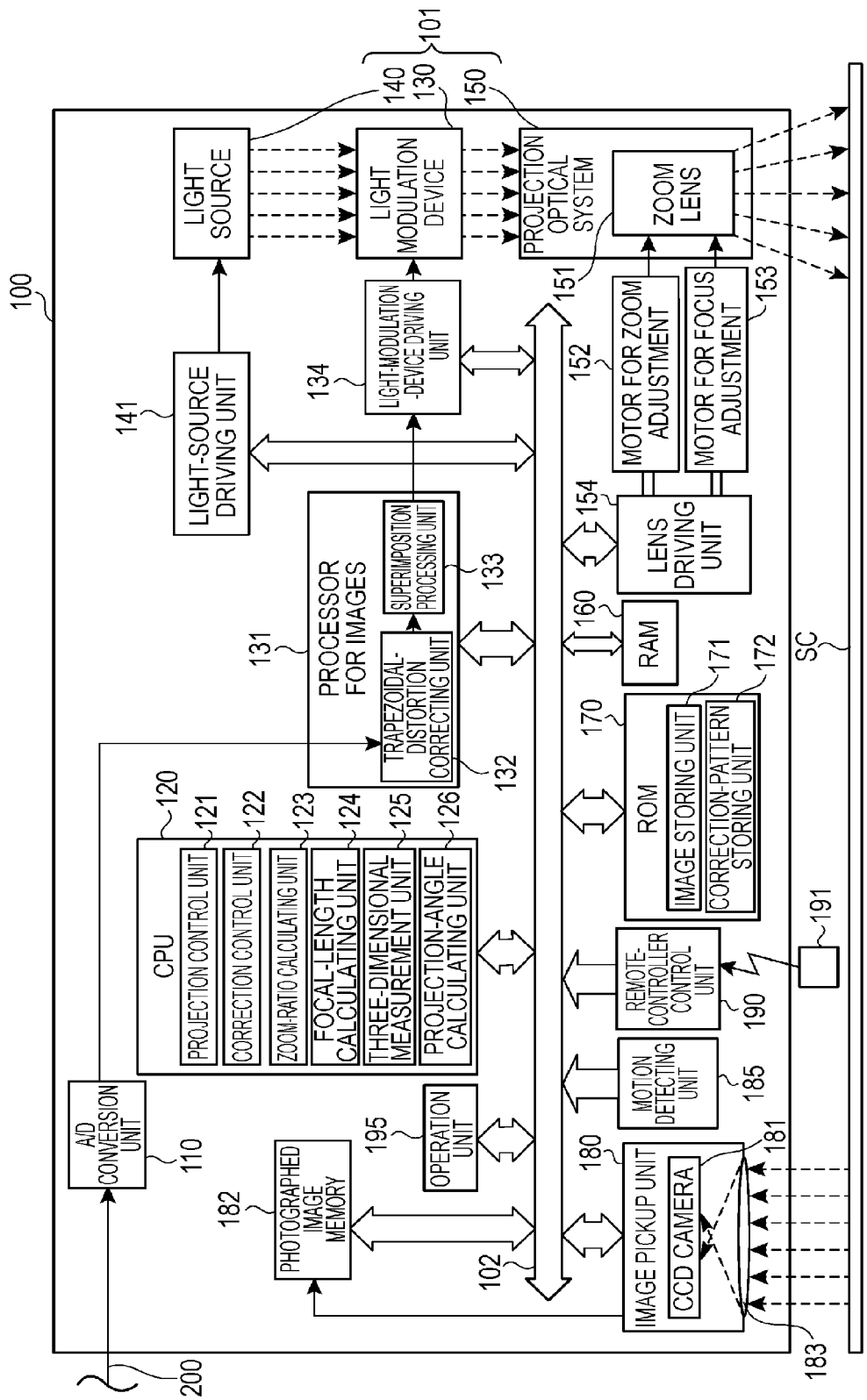
FIG. 1 is a block diagram showing the configuration of a projector according to an embodiment.

FIG. 1 is a block diagram showing an overall configuration of a projector 100 according to the embodiment. The projector 100 projects an image on a screen SC on the basis of an image stored in an image storing unit 171 incorporated therein or image data input from an external image supply apparatus (not shown in the figure) such as a personal computer or various video players. In this embodiment, the screen C stands substantially upright. A screen surface is formed in a rectangular shape.

The image data input to the projector 100 may be either data of a moving image (a video) or data of a still image. The projector 100 can project the video on the screen SC and can continue to project the still image on the screen SC. In an example explained in the embodiment explained below, an image is projected on the basis of an analog image signal input from the external image supply apparatus via a cable 200.

The projector 100 roughly includes a projecting unit 101 (projecting means) that performs formation of an optical image and an image processing system that controls the operation of the entire projector 100 and electrically processes an image signal. The projecting unit 101 includes a light source 140, a light modulation device 130, and a projection optical system 150. As the light source 140, a Xenon lamp, an extra-high pressure mercury lamp, an LED (Light Emitting Diode), a laser light source, or the like can be used. The light source 140 may include a reflector and an auxiliary reflector that guide light emitted by the light source 140 to the light modulation device 130 and a dimming device (not shown in the figure) that reduces the light emitted by the light source 140 on a path leading to the light modulation device 130.

The light modulation device 130 receives a signal from the image processing system explained below and modulates the light emitted by the light source 140 into image light. Examples of a specific configuration of the light modulation device 130 include a system in which three transmissive or reflective liquid crystal light valves corresponding to the respective colors of RGB are used. In this case, the light emitted by the light source 140 is separated in to respective color lights of R, G, and B by a dichroic mirror or the like and made incident on the light modulation device 130. The respective color lights are modulated by liquid crystal panels for the respective colors included in the light modulation device 130. Thereafter, the respective color lights are combined by a cross-dichroic prism and guided to the projection optical system 150. In this embodiment, the light modulation device 130 includes a transmissive liquid crystal panel. The light modulation device 130 is driven by a light-modulation-device driving unit 134 explained below. The light modulation device 130 changes the transmittance of light in respective pixels arranged in a matrix shape to thereby form an image.

The projection optical system 150 includes a zoom lens 151 that performs expansion and reduction of an image to be projected and adjustment of a focus, a motor for zoom adjustment 152 that adjusts a degree of zoom, and a motor for adjustment 153 that performs adjustment of a focus. Light modulated by the light modulating device 130 is made incident on the projection optical system 150. The light is projected on the screen SC through the zoom lens 151 to focus a projected image. The zoom lens 151 includes a lens group including a plurality of lenses. The zoom lens 151 is driven by the motor for zoom adjustment 152 and the motor for focus adjustment 153 to perform, for example, position adjustment for the lenses, whereby zoom adjustment for performing expansion and reduction of the projected image on the screen SC and focus adjustment for properly focusing the projected image on the screen SC are performed.

The image processing system mainly includes a CPU 120 that collectively controls the entire projector 100 and a processor for images 131. The image processing system includes an A/D conversion unit 110, a light-modulation-device driving unit 134, a light-source driving unit 141, a lens driving unit 154, a RAM 160, a ROM 170 including an image storing unit 171 and a correction-pattern storing unit 172, an image pickup unit 180 (image pickup means) including a CCD camera 181, a photographed image memory 182, a motion detecting unit 185, a remote-controller control unit 190, a remote controller 191, and an operation unit 195. The components included in the image processing system are connected to one another via a bus 102.

The A/D conversion unit 110 is a device that subjects an analog input signal, which is input from the external image supply apparatus via the cable 200, to A/D conversion. The A/D conversion unit 110 outputs a digital signal after the conversion to the processor for images 131.

The CPU 120 performs image processing in the projector 100 in cooperation with the processor for images 131. The CPU 120 includes, besides a projection control unit 121 that performs control related to projection by the projector 100, a correction control unit 122, a zoom-ratio calculating unit 123, a focal-length calculating unit 124, a three-dimensional measurement unit 125, and a projection-angle calculating unit 126. The units are realized by the CPU 120 executing a program stored in the ROM 170 in advance. The projection control unit 121 of the CPU 120 functions as a controlling unit.

The processor for images 131 includes a trapezoidal-distortion correcting unit 132 and a superimposition processing unit 133. The processor for images 131 processes, according to the control by the CPU 120, image data input from the A/D conversion unit 110, generates an image signal for rendering a projected image using the light modulation device 130. The processor for images 131 can be configured using a general-purpose processor sold as a DSP (digital signal processor) for trapezoidal distortion correction and image processing and can be configured as a dedicated ASIC. When the projector 100 projects image data stored in the image storing unit 171, the processor for images 131 applies the processing explained above to the image data.

The light-modulation-device driving unit 134 drives the light modulation device 130 on the basis of an image signal input from the processor for images 131. Consequently, an image corresponding to the image signal input to the A/D conversion unit 110 is formed in an image forming region of the light modulation device 130. The image is formed on the screen SC as a projected image via the projection optical system 150.

The light-source driving unit 141 applies a voltage to the light source 140 and lights or extinguishes the light source 140 according to an instruction signal input from the CPU 120. The lens driving unit 154 drives the motor for zoom adjustment 152 and the motor for focus adjustment 153 to perform zoom adjustment and focus adjustment according to the control by the CPU 120.

The RAM 160 forms a work area for temporarily storing programs and data executed by the CPU 120 and the processor for images 131. The processor for images 131 may include, as a built-in RAM, a work area necessary for execution of various kinds of processing such as adjustment processing for a display state of an image performed by the processor for images 131. The ROM 170 stores a program executed by the CPU 120 in order to realize the processing units and data and the like related to the program. The ROM 170 includes an image storing unit 171 that stores an image projected by the projecting unit 101 and a correction-pattern storing unit 172 that stores a correction pattern used for the distortion correction processing.

The image pickup unit 180 includes a CCD camera 181 including a CCD, which is a well-known image sensor, and a camera lens 183 arranged in front of the CCD camera 181. The image pickup unit 180 is provided on the front surface of the projector 100, i.e., in a position where the image pickup unit 180 can pick up, with the CCD camera 181, an image in a direction in which the projection optical system 150 projects an image to the screen SC. In other words, the image pickup unit 180 is provided to photograph a direction same as the projecting direction of the projection optical system 150. Specifically, an optical axis of the camera lens 183 may be parallel to an optical axis of the zoom lens 151. However, the optical axis of the camera lens 183 may slightly tilt to the optical axis side of the zoom lens 151.

In the image pickup unit 180, a photographing direction and an angle of view of the CCD camera 181 and the camera lens 183 are set such that an entire projected image projected on the screen SC at a recommended projection distance lies within at least an image pickup range. The CCD camera 181 may include, besides a CCD, a control circuit that reads out an image signal from the CCD. The camera lens 183 may include, besides a fixed focal lens that forms an image on the CCD, a mechanism such as an auto iris that adjusts an amount of light made incident on the CCD. Data of a photographed image photographed by the CCD camera 181 is output from the image pickup unit 180 to the photographed image memory 182 and repeatedly written in a predetermined region of the photographed image memory 182. When writing of image data for one screen is completed, the photographed image memory 182 sequentially reverses a flag of a predetermined region. Therefore, by referring to the flag, the CPU 120 can learn whether image pickup performed using the image pickup unit 180 is completed. The CPU 120 accesses the photographed image memory 182 and acquires necessary photographed image data while referring to the flag.

The motion detecting unit 185 includes a gyro sensor and an acceleration sensor. The motion detecting unit 185 detects a motion of a main body of the projector 100 and outputs a detection value to the CPU 120. A threshold is set for the detection value of the motion detecting unit 185 in advance. When a motion exceeding the threshold is detected by the motion detecting unit 185, the CPU 120 determines that the projector 100 has moved. When a motion detected by the motion detecting unit 185 is equal to or smaller than the threshold and this state continues exceeding a standby time set in advance, the CPU 120 determines that the projector 100 has stood still. The motion detecting unit 185 may be configured to output a detection signal to the CPU 120 when the threshold is set in the motion detecting unit 185 and the detection value of the motion detecting unit 185 exceeds the threshold and when the detection value of the motion detecting unit 185 is equal to or smaller than the threshold and the standby time elapses. In this case, it is possible to reduce a load on the CPU 120.

The remote-controller control unit 190 receives a radio signal transmitted from the remote controller 191 on the outside of the projector 100. The remote controller 191 includes operators (not shown in the figure) operated by a user. The remote controller 191 transmits an operation signal corresponding to operation of the operators as an infrared signal or a radio signal that is transmitted using a radio wave having a predetermined frequency. The remote-controller control unit 190 includes a light receiving unit (not shown in the figure) that receives the infrared signal and a receiving circuit (not shown in the figure) that receives the radio signal. The remote-controller control unit 190 receives a signal transmitted from the remote controller 191, analyzes the signal, generates a signal indicating content of the operation by the user, and outputs the signal to the CPU 120.

The operation unit 195 includes, for example, operators (not shown in the figure) of an operation panel arranged in a main body of the projector 100. Upon detecting operation of the operators, the operation unit 195 outputs an operation signal corresponding to the operators to the CPU 120. As the operators, there are a switch for instructing power on/power off, a switch for instructing a distortion correction processing start, and the like.

Functions of the CPU 120 and the processor for images 131 are explained.

The projection control unit 121 controls, on the basis of image data output by the A/D conversion unit 110, an action of projection of an image by the projecting unit 101. Specifically, the projection control unit 121 performs control for causing the light-source driving unit 141 to light/extinguish the light source 140 according to power on/off of the projector 100, control for causing the processor for images 131 to process image data output by the A/D conversion unit 110, and the like.

The projection control unit 121 has a function of starting and ending distortion correction processing by the correction control unit 122 for controlling the trapezoidal-distortion correcting unit 132 and correcting trapezoidal distortion. The correction control unit 122 cooperates with the trapezoidal-distortion correcting unit 132 and functions as a correcting unit.

As a start condition for starting the distortion correction processing, it is set in advance that, for example, a motion of the projector 100 is detected on the basis of a detection value of the motion-detecting unit 185 or the distortion correction processing is instructed by operation of the operation unit 195 or the remote controller 191. When any one of the set conditions is met, the projection control unit 121 determines that the start condition for the distortion correction processing holds. The projection control unit 121 controls the superimposition processing unit 133 of the processor for images 131 to superimpose a correction pattern (an image for adjustment) stored in the correction-pattern storing unit 172 on an image being projected and project the correction pattern. Consequently, the image that has been projected from before the start of the distortion correction processing and the correction pattern are displayed one on top of the other.

The projection control unit 121 causes the correction control unit 122 to execute the distortion correction processing. Upon starting the distortion correction processing, the correction control unit 122 causes the image pickup unit 180 to pick up an image of the screen SC in a state in which the correction pattern stored in the image storing unit 171 is projected on the screen SC and acquires photographed image data from the photographed image memory 182. The correction control unit 122 performs processing for detecting an image of the correction pattern from the acquired photographed image data. The correction control unit 122 calculates, on the basis of the detected image of the correction pattern, a projection angle, which is a tilt of an optical axis of projected light projected from the projector 100 with respect to the plane of the screen SC, and a relative distance between the projector 100 and the screen SC (hereinafter referred to as projection distance) according to the functions of the processing units, i.e., the zoom-ratio calculating unit 123, the focal-length calculating unit 124, the three-dimensional measurement unit 125, and the projection-angle calculating unit 126. The correction control unit 122 controls the lens driving unit 154 according to the calculated projection distance to perform focus adjustment.

The correction control unit 122 calculates parameters for performing the distortion correction processing on the basis of the projection angle and the projection distance calculated by the functions of the processing units, i.e., the zoom-ratio calculating unit 123, the focal-length calculating unit 124, the three-dimensional measurement unit 125, and the projection-angle calculating unit 126. The parameters are parameters for deforming an image rendered by the light modulation device 130 such that the image compensates for distortion of a projected image on the screen SC. The parameters include data for defining the direction of the deformation, a deformation amount, and the like. The correction control unit 122 outputs the calculated parameters to the trapezoidal-distortion correcting unit 132 and causes the trapezoidal-distortion correcting unit 132 to execute the distortion correction processing.

The processing units, i.e., the zoom-ratio calculating unit 123, the focal-length calculating unit 124, the three-dimensional measurement unit 125, and the projection-angle calculating unit 126 perform, according to the control by the correction control unit 122, processing necessary for calculating the projection distance and the projection angle.

The processor for images 131 is a functional unit that processes image data input from the A/D conversion unit 110. The processor for images 131 applies, to projection target image data, processing for adjusting a display state of an image such as luminance, contrast, the depth of a color, and a tint and outputs the image data after the processing to the light-modulation-device driving unit 134.

The trapezoidal-distortion correcting unit 132 included in the processor for images 131 performs, according to the parameters input from the correction control unit 122, processing for deforming the image of the image data output by the A/D conversion unit 110.

The superimposition processing unit 133 has a function of superimposing the correction pattern stored in the correction-pattern storing unit 172 on a projected image. The superimposition processing unit 133 is connected to the post stage of the trapezoidal-distortion correcting unit 132. The image data after the processing by the trapezoidal-distortion correcting unit 132 is input to the superimposition processing unit 133. Therefore, when the trapezoidal-distortion correcting unit 132 performs the distortion correction processing and when the trapezoidal-distortion correcting unit 132 does not perform the distortion correction processing, the superimposition processing unit 133 superimposes the correction pattern on the image data processed by the trapezoidal-distortion correcting unit 132. With this configuration, the distortion correction processing is not applied to the image on which the superimposition processing unit 133 superimposes the correction pattern. In other words, the correction pattern projected by the projector 100 is always in a state in which the distortion correction processing is not applied to the correction pattern. The image on which the correction pattern is superimposed by the superimposition processing unit 133 in this way is projected on the screen SC by the projection optical system 150. The distortion correction processing is performed on the basis of the projected image.

The operation of the projector 100 for detecting the correction pattern on the basis of photographed image data of the image pickup unit 180 is explained in detail below.

Figure 2A:
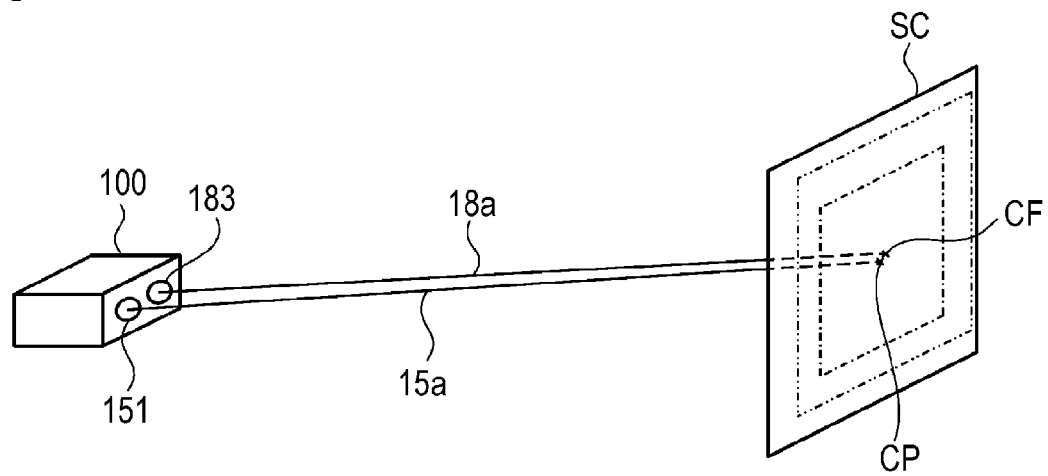
FIG. 2A is an explanatory diagram showing a relation between relative positions of a projector and a screen and a photographed image, and showing the relative positions of the projector and the screen.
Figure 2B:
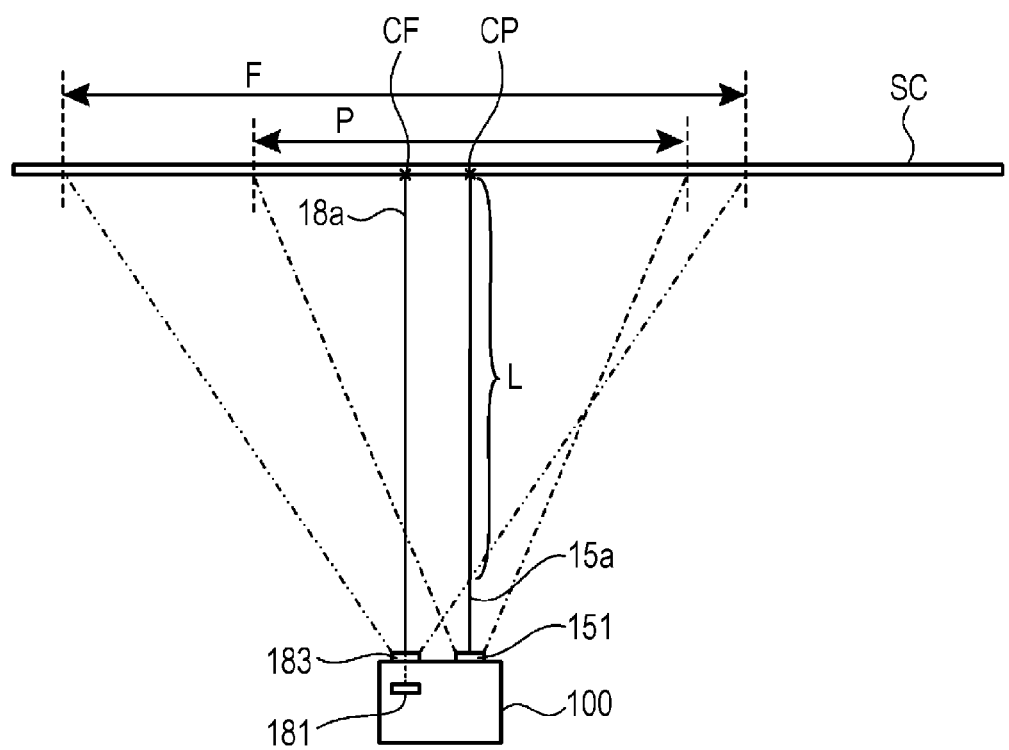
FIG. 2B is an explanatory diagram showing a relation between relative positions of a projector and a screen and a photographed image, and showing the relative positions of the projector and the screen.
Figure 2C:
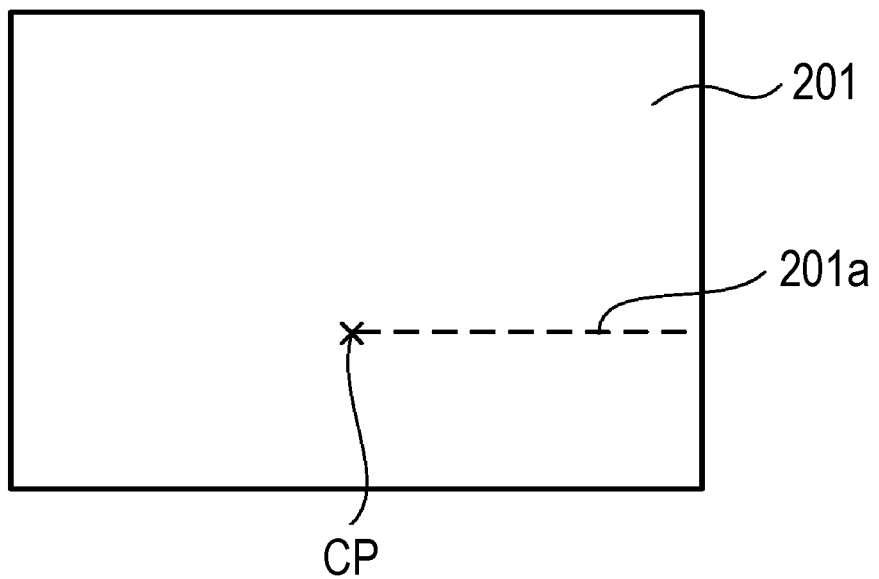
FIG. 2C is an explanatory diagram showing a relation between relative positions of a projector and a screen and a photographed image, and showing an epipolar line in the photographed image.

FIGS. 2A to 2C are explanatory diagrams showing a relation between relative positions of the projector 100 and the screen SC and a photographed image, wherein FIGS. 2A and 2B show the relative positions of the projector and the screen and FIG. 2C shows an epipolar line in the photographed image. The rear surface of the screen SC appears in FIG. 2A.

FIG. 2A is a perspective view of the projector 100 and the screen SC. In an example shown in FIG. 2A, the projector 100 is set substantially in front of the screen SC and right opposed to the screen SC. An optical axis 15a of the zoom lens 151 and an optical axis 18a of the CCD camera 181 are substantially parallel to each other. An intersection point of the optical axis 15a and the screen SC is set as a point of attention CP and an intersection point of the optical axis 18a and the screen SC is set as a photographing center point CF. When the zoom lens 151 and the camera lens 183 are fixed to the main body of the projector 100, a relative positional relation between the zoom lens 151 and the camera lens 183 is fixed.

FIG. 2B is a plan view showing a state of FIG. 2A. On the screen SC, an image is projected in a projection range P centering on the point of attention CP from the zoom lens 151. The image pickup unit 180 photographs an image pickup range F centering on the photographing center point CF.

In the state shown in FIG. 2B, as shown in FIG. 2C, a range including the point of attention CP is reflected on a photographed image 201 photographed by the image pickup unit 180. On the photographed image 201, the optical axis 15a is equivalent to a straight line extending to the point of attention CP. The straight line is an epipolar line 201a of the optical axis of the zoom lens 151. In the following explanation, the straight line is simply referred to as epipolar line 201a. However, the point of attention CP and the epipolar line 201a are not reflected on an actual photographed image as images. In FIG. 2C, a positional relation between the epipolar line 201a and the point of attention CP is illustrated. The epipolar line 201a of this example is equivalent to the optical axis 15a in a range indicated by a sign L in FIG. 2B.

Since the epipolar line 201a corresponds to the position of the optical axis 15a of the zoom lens 151, the epipolar line 201a does not substantially move according to a zoom ratio of the projection optical system 150. In other words, when the zoom ratio of the zoom lens 151 is changed and an image is expanded or reduced, the image is expanded or reduced centering around the optical axis 15a (the point of attention CP) on the screen SP. Therefore, the positions of the point of attention CP and the optical axis 15a, which are the center of the expansion or the reduction of the image on the screen SC do not change even if the zoom ratio is changed. The positions of the point of attention CP and the epipolar line 201a in the photographed image 201 sometimes change according to a distance between the projector 100 and the screen SC. This is because the optical axis 15a and the optical axis 18a do not completely coincide with each other. However, change amounts (moving amounts) of the point of attention CP and the epipolar line 201a in the photographed image 201 are small. For example, it hardly occurs that the point of attention CP and the epipolar line 201a deviate from an angle of view of the photographed image 201.

Figure 3A:
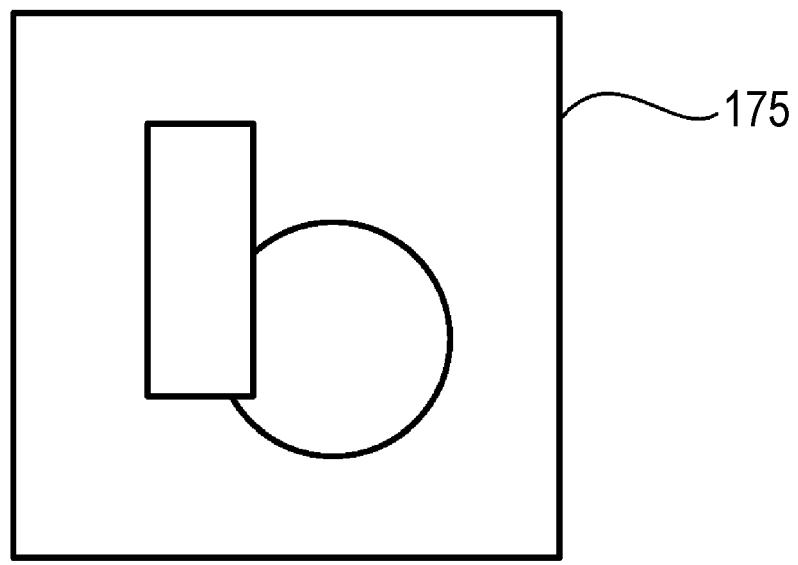
FIG. 3A is an explanatory diagram showing a correction pattern projected by the projector, and showing an example of an image to be projected.

FIGS. 3A to 3D are explanatory diagrams showing a correction pattern projected by the projector 100, wherein FIG. 3A shows an example of an image to be projected, FIG.

Figure 3B:
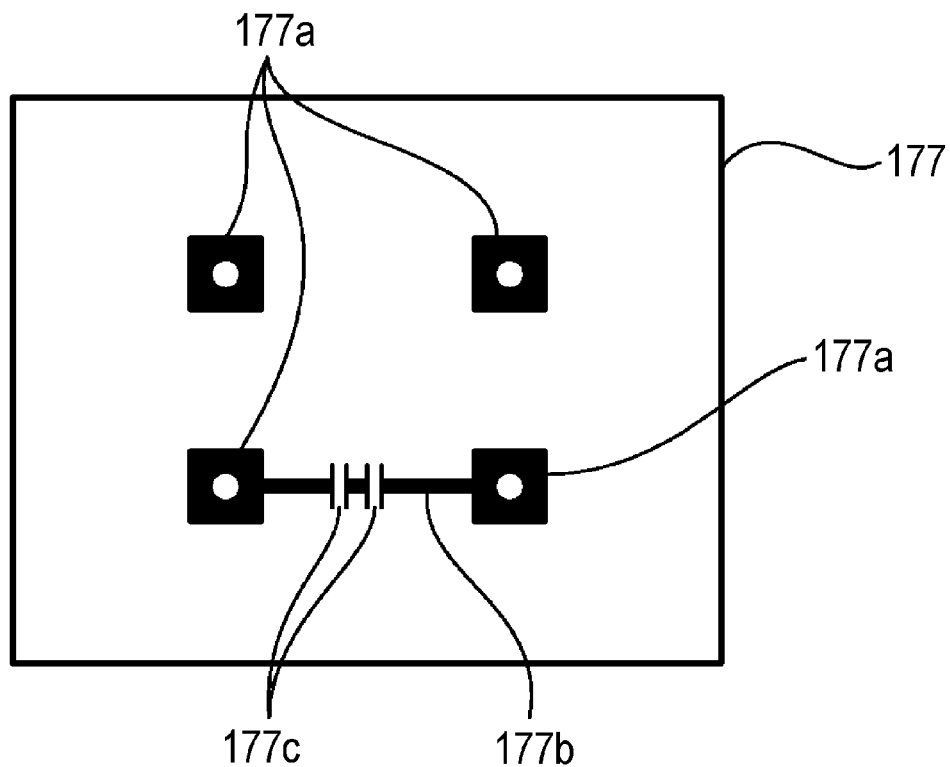
FIG. 3B is an explanatory diagram showing a correction pattern projected by the projector, and showing an example of the correction pattern.
Figure 3C:
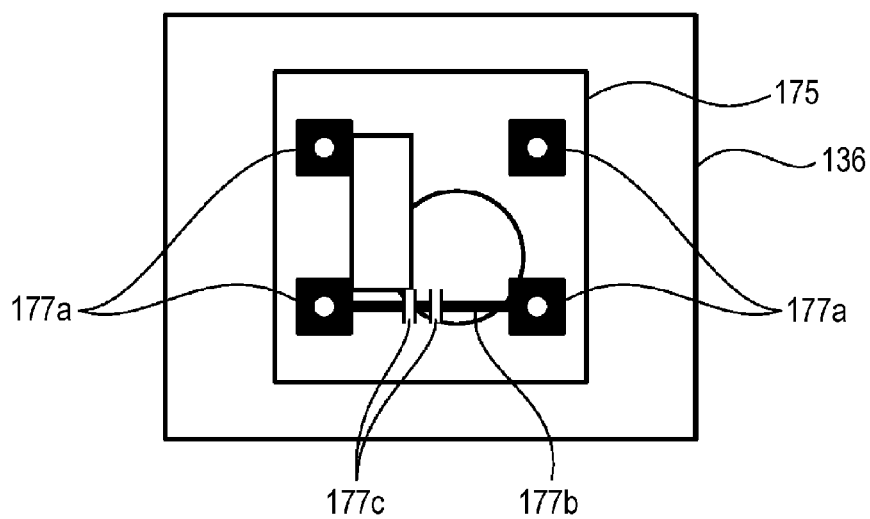
FIG. 3C is an explanatory diagram showing a correction pattern projected by the projector, and showing an example in which a light modulation device renders the image and the correction pattern.
Figure 3D:
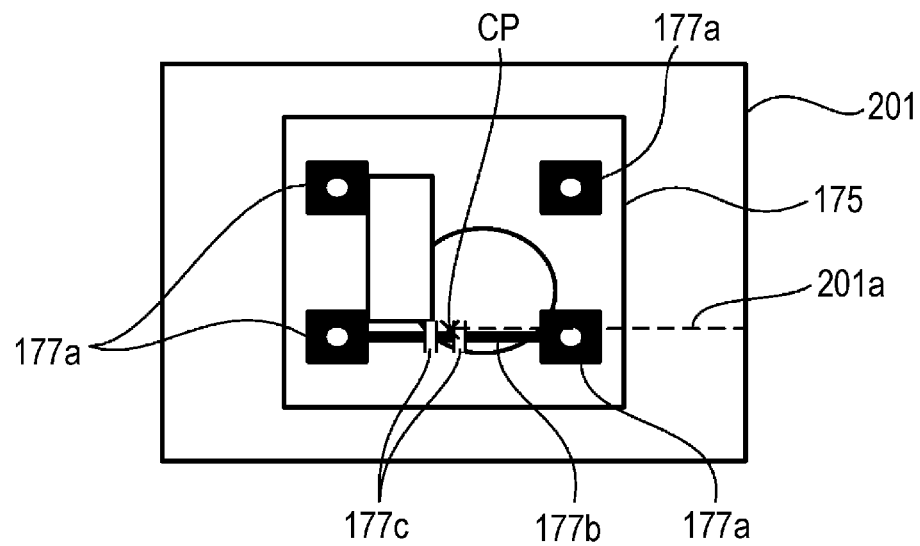
FIG. 3D is an explanatory diagram showing a correction pattern projected by the projector, and showing an example of a photographed image.

3B shows an example of the correction pattern, FIG. 3C shows an example in which the light modulation device renders the image and the correction pattern, and FIG. 3D shows an example of a photographed image.

In this embodiment, an example in which a rectangular image 175 is projected as shown in FIG. 3A is explained. In this embodiment, as an example of the correction pattern, a correction pattern 177 shown in FIG. 3B is explained. The correction pattern 177 has a rectangular shape as a whole with square black markers 177a (a first pattern) arranged in the vicinity of the four corners. Each of the markers 177a is a figure including a white point in a black square. In the correction pattern 177, a linear black region 177b (a second pattern) is arranged. Two position markers 177c (a second pattern) are arranged to overlap the black region 177b. The position markers 177c are figures having a predetermined shape. In the example shown in FIGS. 3A to 3D, the position markers 177c are rectangular. A color of the position markers 177c is white such that the position markers 177c can be clearly distinguished on the black region 177b.

When the superimposition processing unit 133 superimposes the correction pattern 177 on the image 175, an image shown in FIG. 3C is rendered in an image formable region 136 of the light modulation device 130. The example shown in FIG. 3C indicates a state before processing for correcting trapezoidal distortion is corrected. The image is rendered widely using the image formable region 136 of the light modulation device 130. Therefore, the image 175 is formed (rendered) in the entire image formable region 136. The correction pattern 177 is rendered to be superimposed on the image 175. The correction pattern 177 excluding the markers 177a, the black region 177b, and the position markers 177c is transparent. Therefore, the markers 177a, the black region 177b, and the position markers 177c are rendered on the image 175 one on top of another.

When the image obtained by superimposing the correction pattern 177 on the image 175 is projected on the screen SC and photographed by the image pickup unit 180, a photographed image is formed as shown in FIG. 3D. The image 175 and the correction pattern 177 are reflected on the photographed image 201 shown in FIG. 3D.

The black region 177b is arranged to be reflected in a position overlapping the epipolar line 201a or in the vicinity of the epipolar line 201a. The position of the epipolar line 201a in the photographed image 201 can be generally specified from the positional relation between the zoom lens 151 and the camera lens 183. A rendering position of the correction pattern 177 in the image formable region 136 can be specified on the basis of the resolution of the correction pattern 177 and the resolution of the image formable region 136. In this way, in the correction pattern 177, the black region 177b is arranged to be projected in the position overlapping the epipolar line 201a or the vicinity of the epipolar line 201a. The position markers 177c are arranged on the black region 177b. Consequently, the black region 177b and the position markers 177c are always reflected in substantially the same positions in the photographed image 201. Therefore, if the correction control unit 122 searches through a narrow region including an epipolar line from photographed image data acquired from the photographed image memory 182, the correction control unit 122 can detect a black region and position markers.

Further, as explained above, the superimposition processing unit 133 is connected to the post stage of the trapezoidal-distortion correcting unit 132. Therefore, the superimposition processing unit 133 always superimposes a correction pattern not processed by the trapezoidal-distortion correcting unit 132 on an image. In other words, the distortion correction processing is not applied to the correction pattern.

The image formable region 136 is a largest region in which the light modulation device 130 can render an image. When the distortion correction processing is performed, the shape of an image to be rendered in the image formable region 136 is deformed. For example, the image deformed in a reverse trapezoidal shape is rendered in the image formable region 136 to compensate for trapezoidal distortion. In this case, compared with a rectangular image fully rendered in the image formable region 136, the size of the image is reduced. On the other hand, since the correction pattern 177 is rendered in the image formable region 136 without undergoing the distortion correction processing, positions where the markers 177a, the black region 177b, and the position markers 177c are rendered in the image formable region 136 are fixed. Therefore, the black region 177b and the position markers 177c do not substantially deviate from the epipolar line 201a. It is possible to promptly detect the black region 177b and the position markers 177c from the photographed image 201.

FIGS. 4A to 4D are explanatory diagrams showing a relation between the zoom ratio of the projector 100 and the photographed image, and showing examples of the photographed image obtained when a projection distance and the zoom ratio are variously changed.

Figure 4A:
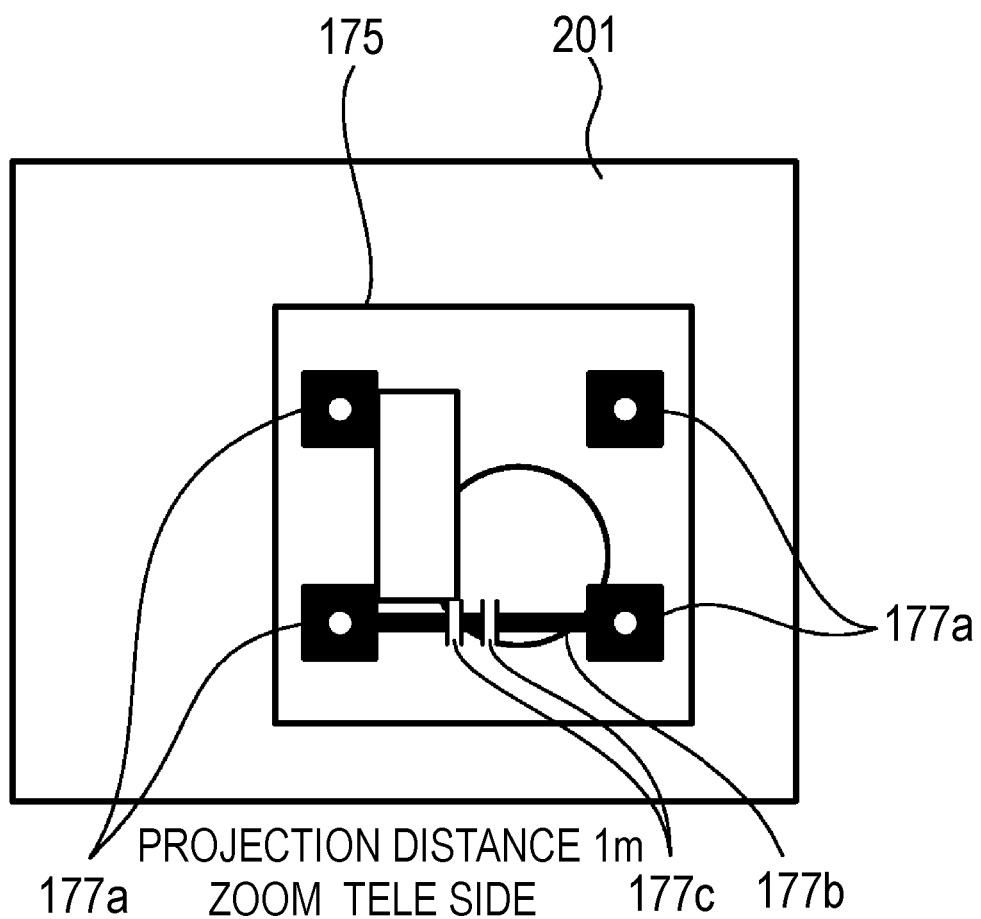
FIG. 4A is an explanatory diagram showing a relation between a zoom ratio of the projector and the photographed image, and showing examples of the photographed image obtained when a projection distance and the zoom ratio are variously changed.
Figure 4B:
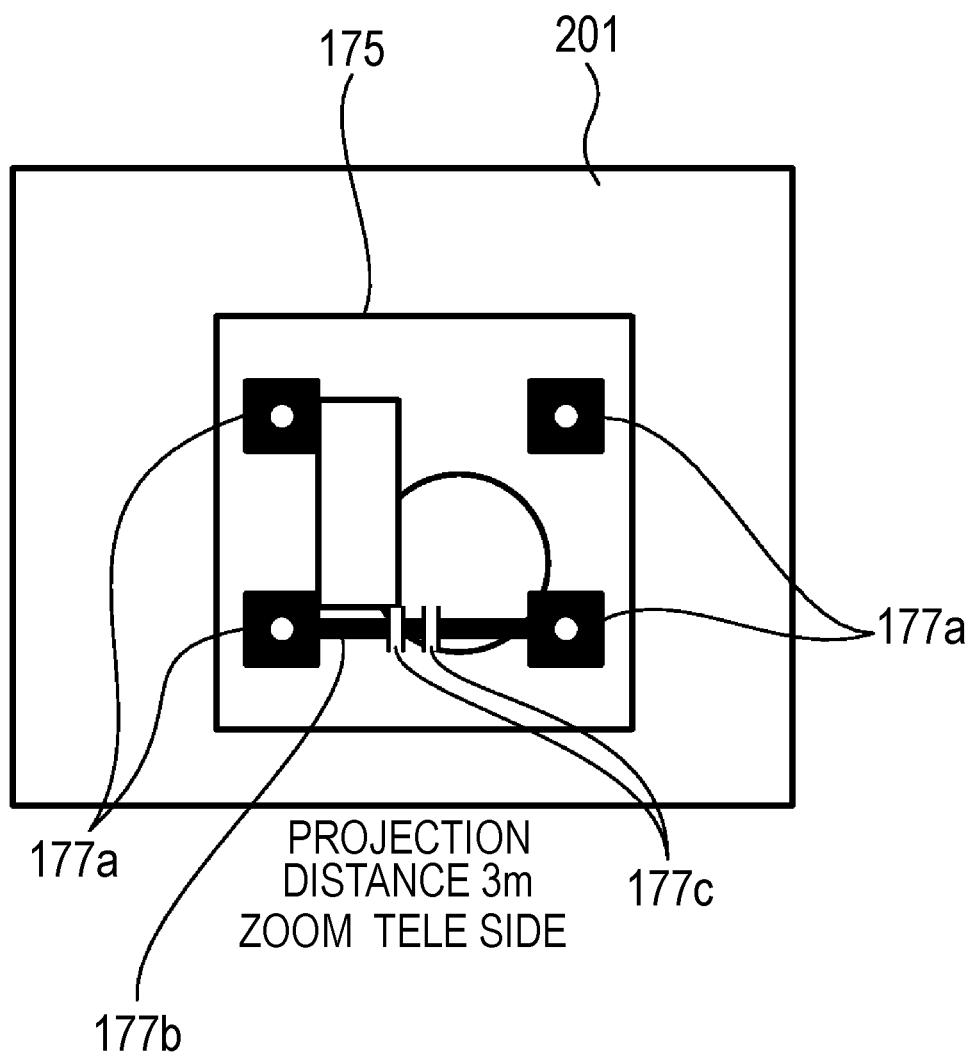
FIG. 4B is an explanatory diagram showing a relation between a zoom ratio of the projector and the photographed image, and showing examples of the photographed image obtained when a projection distance and the zoom ratio are variously changed.
Figure 4D:
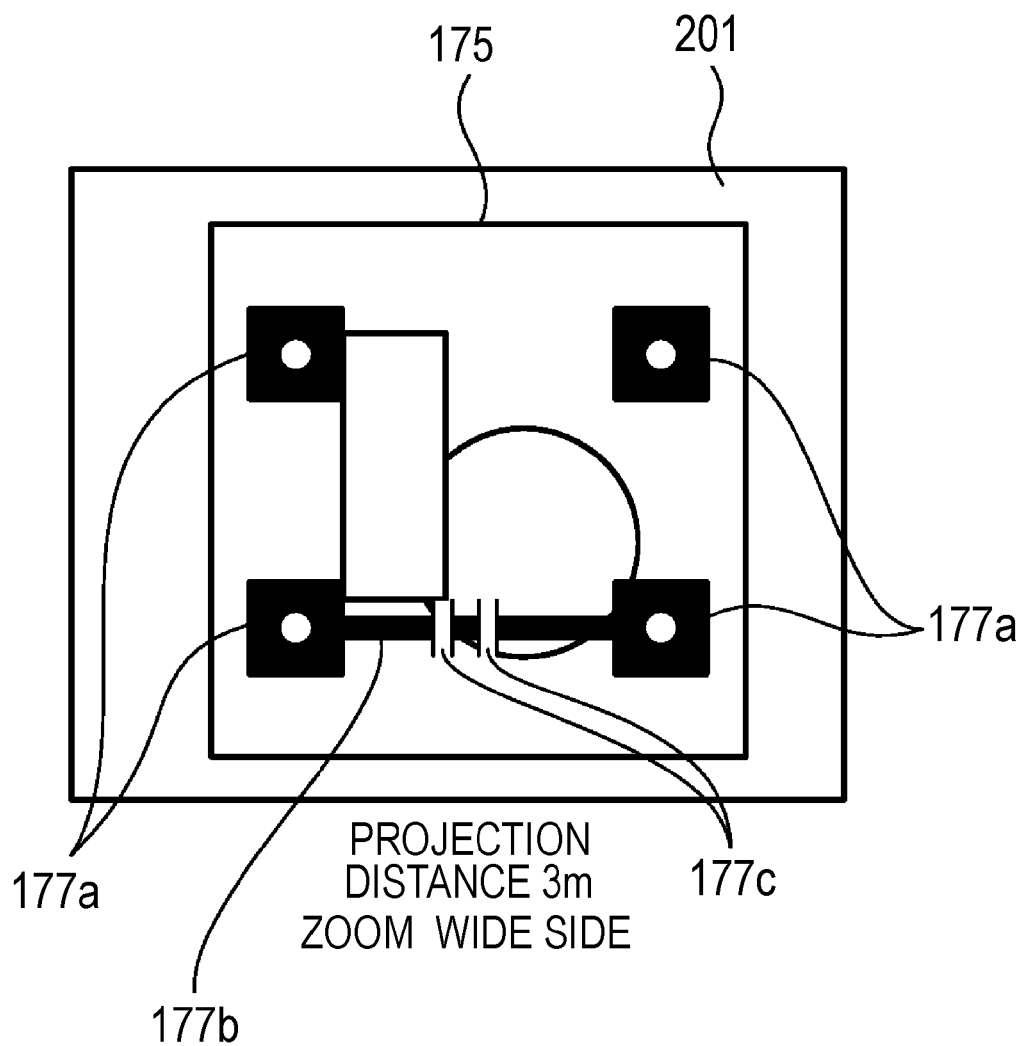
FIG. 4D is an explanatory diagram showing a relation between a zoom ratio of the projector and the photographed image, and showing examples of the photographed image obtained when a projection distance and the zoom ratio are variously changed.

In FIG. 4A, an example in which the projection distance is set to 1 m and the zoom ratio is set on a tele side is shown. In FIG. 4B, an example in which the projection distance is set to 3 m and the zoom ratio is set on the tele side is shown. In FIG. 4C, an example in which the projection distance is set to 1 m and the zoom ratio is set on a wide side is shown. In FIG. 4D, an example in which the projection distance is set to 3 m and the zoom ratio is set on the wide side is shown. As it is seen when FIG. 4A and FIG. 4B are compared, the positions of the markers 177a, the black region 177b, and the position markers 177c on the photographed image 201 are different depending on a difference in the projection distance. The same applies when FIG. 4C and FIG. 4D are compared. However, it is evident that the black region 177b and the position markers 177c move along the epipolar line 201a and do not substantially deviate from the epipolar line 201a even if the projection distance changes.

As it is evident from this comparison, if the zoom ratio is fixed, the size of the entire correction pattern 177 on the screen SC does not change even if the projection distance changes. Therefore, a relative positional relation among the markers 177a, the black region 177b, and the position markers 177c is fixed. Therefore, if the position markers 177c can be detected, it is possible to highly accurately estimate the positions of the four markers 177a on the basis of the positions of the position markers 177c.

As it is seen when FIG. 4A and FIG. 4C are compared, when the zoom ratio is changed, the size of the entire correction pattern 177 on the screen SC changes. Therefore, the positions of the markers 177a, the black region 177b, and the position markers 177c on the photographed image 201 change according to the zoom ratio. The same applies when FIG. 4B and FIG. 4D are compared. However, since the black region 177b and the position markers 177c are present on the epipolar line 201a, it is evident that the black region 177b and the position markers 177c do not substantially deviate from the epipolar line 201a even if the zoom ratio changes.

As it is evident from these comparisons, when the zoom ratio changes, since the size of the entire correction pattern 177 on the screen SC changes, the relative positional relation among the marker 177*a*, the black region 177*b*, and the position markers 177*c* changes. For example, an interval between the two position markers 177*c* increases or decreases according to the zoom ratio. Therefore, if a relation between the zoom ratio and the interval between the two position markers 177*c* is known, by detecting the two position markers 177*c*, it is possible to calculate the zoom ratio from the interval between the two position markers 177*c*. In other words, if a coefficient indicating the relation between the zoom ratio and the interval between the two position markers 177*c* is stored in the ROM 170, it is possible to promptly detect the two position markers 177*c* and calculate the zoom ratio. Further, if the zoom ratio and the positions of the position markers 177*c* are evident, it is possible to highly accurately estimate the positions of the four markers 177*a*.

The correction pattern 177 is formed by placing the white position markers 177*c* on the black region 177*b*. Therefore, it is possible to easily detect the position markers 177*c*. If the end position of the position marker 177*c* in a direction along the epipolar line 201*a* can be detected, since the interval between the position markers 177*c* can be calculated, the zoom ratio can be calculated. Therefore, it is unnecessary to detect all the contours of the position markers 177*c*. The ends of the position markers 177*c* only have to be cable of being detected in the direction in which the epipolar line 201*a* extends in the photographed image 201. In the example in this embodiment, since the black region 177*b* is arranged along the epipolar line 201*a*, a boundary between the black region 177*b* and the position marker 177*c* only has to be capable of being detected in the length direction of the black region 177*b*. Therefore, the position makers 177*c* in this embodiment only have to be mere white rectangles, contour lines of which are not colored. A color of the position markers 177*c* only has to be easily distinguishable from the black region 177*b*. The function of the position markers 177*c* is sufficiently displayed if the color is a high-luminance color other than white.

Figure 5:
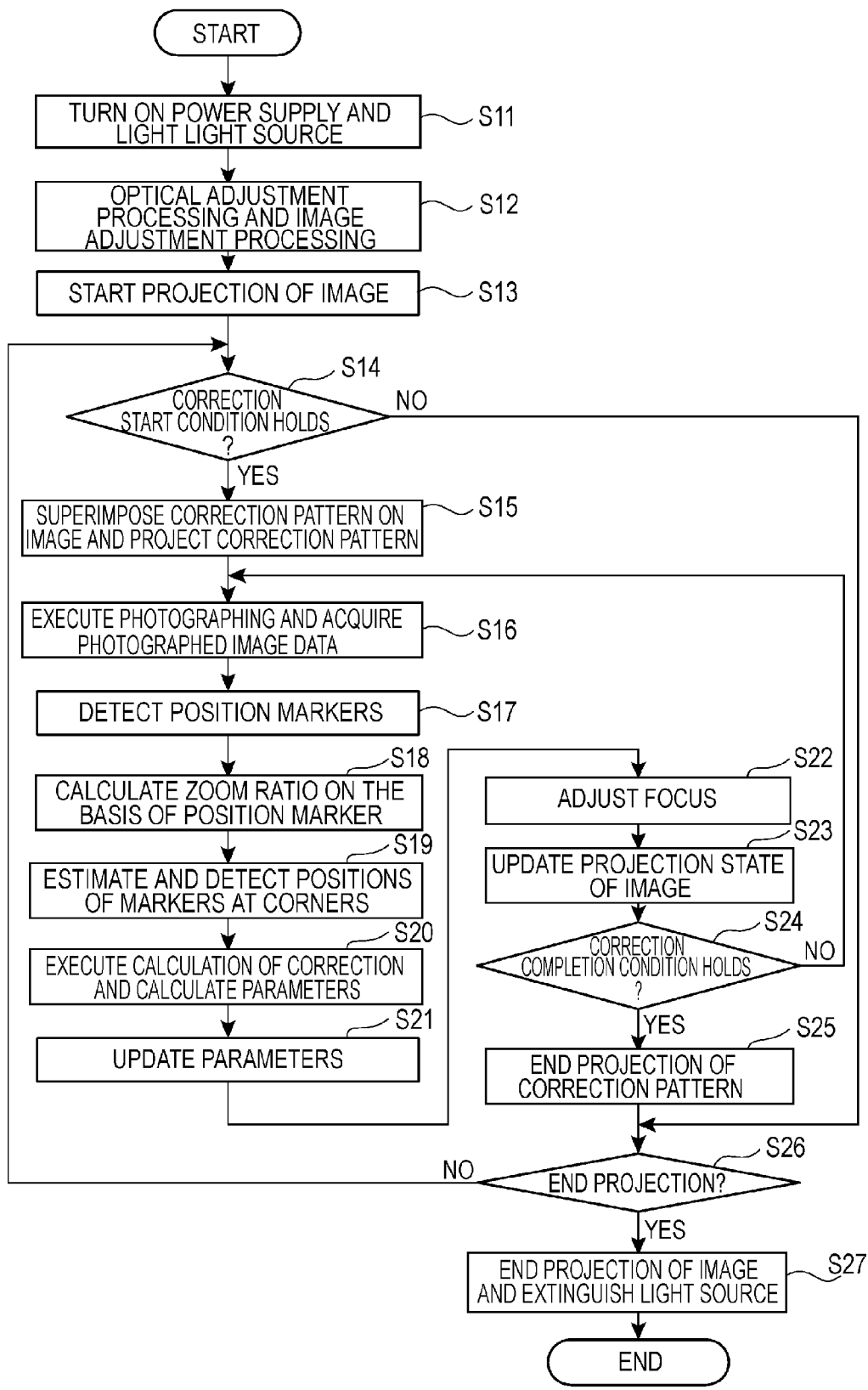
FIG. 5 is a flowchart for explaining the operation of the projector.

FIG. 5 is a flowchart for explaining the operation of the projector 100.

When a power supply for the projector 100 is turned on, the CPU 120 controls the light-source driving unit 141 to light the light source 140 (step S11). Further, the CPU 120 controls the lens driving unit 154 to execute optical adjustment in the projection optical system 150 and causes the processor for images 131 to execute adjustment or the like adapted to the brightness of an image and a designated color mode (step S12). Thereafter, the projection control unit 121 causes the projecting unit 101 to project an image output from the A/D conversion unit 110 (step S13).

After the projection is started, the projection control unit 121 determines whether a start condition for the distortion correction processing holds (step S14). The start condition for the distortion correction processing is that, for example, start instruction operation by the remote controller 191 or the operation unit 195 is performed or a detection value of the motion detecting unit 185 exceeds the threshold. When the start instruction operation by the remote controller 191 or the operation unit 195 is performed or the detection value of the motion detecting unit 185 exceeds the threshold, the projection control unit 121 determines that the start condition for the distortion correction processing holds (Yes in step S14), reads out the correction pattern 177 stored in the correction-pattern storing unit 172, causes the superimposition processing unit 133 to superimpose the correction pattern 177 on the image, and causes the projecting unit 101 to project the correction pattern 177 on the screen SC (step S15).

Subsequently, the correction control unit 122 causes the image pickup unit 180 to photograph the screen SC and acquires photographed image data from the photographed image memory 182 (step S16).

The correction control unit 122 detects the position markers 177*c* included in the photographed image data (step S17). Subsequently, the correction control unit 122 calculates, with the zoom-ratio calculating unit 123, a zoom ratio on the basis of the positions of the detected position markers 177*c* and the interval between the two position markers 177*c* (step S18). Further, the correction control unit 122 estimates the positions of the markers 177*a* on the basis of the positions of the position markers 177*c* and the interval between the two position markers 177*c*, searches through the image data in the estimated positions, and detects the markers 177*a* (step S19).

Thereafter, the correction control unit 122 performs, on the basis of the positions of the markers 177*a*, calculation by the zoom-ratio calculating unit 123, the focal-length calculating unit 124, the three-dimensional measurement unit 125, and the projection-angle calculating unit 126 and calculates parameters for correcting trapezoidal distortion that occurs in the image on the screen SC (step 320).

The correction control unit 122 updates the parameter set in the trapezoidal-distortion correcting unit 132 with the new parameters (step S21) and causes the trapezoidal-distortion correcting unit 132 to execute the distortion correction processing for the image being projected. The correction control unit 122 controls the lens driving unit 154 on the basis of a value calculated from the positions of the markers to execute focus adjustment (step S22). Thereafter, the distortion correction processing based on the new parameters is applied by the trapezoidal-distortion correcting unit 132. An image obtained by the superimposition processing unit 133 superimposing the correction pattern on the image after the processing is projected on the screen SC (step S23).

The projection control unit 121 determines whether a condition for completing the distortion correction processing holds (step S24). The condition for completing the distortion correction processing is that, for example, instruction operation for completing the distortion correction processing is performed by the remote controller 191 or the operation unit 195 or the detection value of the motion detecting unit 185 is equal to or smaller than the threshold and a standby time elapses. When both the conditions do not hold (No in step S24), the projection control unit 121 returns to step S16. On the other hand, when the instruction operation for completing the distortion correction processing is performed by the remote controller 191 or the operation unit 195 or the detection value of the motion detecting unit 185 is equal to or smaller than the threshold and the standby time elapses, the projection control unit 121 determines that the condition for completing the distortion correction processing holds (Yes in step S24) and causes ends the superimposition processing unit 133 to end the processing for superimposing the correction pattern (step S25). Thereafter, the projection control unit 121 determines whether the projector 100 ends the projection (step S26). When the projector 100 does not end the projection (No in step S26), the projection control unit 121 returns to step S14. When the projector 100 ends the projection according to the operation by the remote controller 191 or the operation unit 195 (Yes in step S26), the projection control unit 121 stops the operation related to the projection of the image by the projecting unit 101 and extinguishes the light source 140 (step S27).

When the start condition for the distortion correction processing does not hold (No in step S14), the projection control unit 121 shifts to step S23 and determines whether the projection ends. When the projector 100 does not end the projection in step S26, the projection control unit 121 returns to step S14 and repeatedly determines whether the start condition holds. A period of the determination in step S14 is set in advance. In other words, the determination is repeatedly executed at the set period while the start condition does not hold and the projector 100 does not end the projection.

As explained above, according to the control by the projection control unit 121, when it is determined that the start condition for the distortion correction processing holds, the projector 100 executes the distortion correction processing before the projector 100 stands still and, thereafter, repeatedly executes the distortion correction processing at the period set in advance until the condition for completing the distortion correction processing is met. Consequently, the distortion correction processing is periodically performed and an image after correction is projected on the screen SC. Therefore, the user who uses the projector 100 can see a state of the correction even before the projector 100 stands still or the operation for completing the distortion correction processing is performed. Before the standby time elapses after the movement of the projector 100 stops, the distortion correction processing is executed in a state in which the projector 100 stands still. Therefore, the corrected image is projected on the screen SC according to a position where the projector 100 stands still. Consequently, substantially, it is possible to project the corrected image before the standby time elapses and promptly project an image without distortion. In this case, it is desirable that the period of the repeated execution of the distortion correction processing by the projector is time shorter than the standby time.

When the distortion correction is continuously executed a plurality of times in this way, if the distortion correction processing is applied to the correction pattern 177 as well, it is necessary to perform, concerning the positions of the markers 177*a*, calculation for excluding the influence of the distortion correction performed the plurality of times. A load of the processing for calculating the parameters increases. Therefore, as in this embodiment, if the distortion correction processing is not performed concerning the correction pattern 177, the positions of the markers 177*a* are always positions shifted by reflecting the setting angle and the distance between the screen SC and the projector 100. Therefore, even if the distortion correction processing is repeatedly performed, it is possible to promptly calculate the setting angle and the distance between the screen SC and the projector 100 accurately and calculate accurate parameters on the basis of the positions of the markers 177*a*. A load of the processing for calculating the parameters does not increase even if the distortion correction processing is repeatedly performed.

The correction pattern 177 is arranged such that the position markers 177*c* functioning as reference images are arranged in positions overlapping the epipolar line 201*a* or in the vicinity of the epipolar line 201*a* in the photographed image 201 of the image pickup unit 180. Therefore, the position markers 177*c* can be promptly detected from the photographed image 201. When the position markers 177*c* are detected, a zoom ratio can be calculated on the basis of the interval between the two position markers 177*c*. Further, the positions of the markers 177*a* can be estimated from the positions of the position markers 177*c*. Therefore, the markers 177*a* can be promptly detected by processing with a small load. Consequently, it is possible to promptly detect the marker 177*a* projected on the screen SC and perform the distortion correction processing.

Since the superimposition processing unit 133 is connected to the post stage of the trapezoidal-distortion correcting unit 132, the correction pattern 177 is not affected by the trapezoidal distortion correction and is always rendered in the same position in the image formable region 136. Therefore, the positions of the position markers 177*c* do not substantially deviate from the epipolar line 201*a*. It is possible to stably and promptly detect the position markers 177*c* from the photographed image 201.

As explained above, the projector 100 according to the embodiment to which the invention is applied includes the projecting unit 101 that projects an image on the screen SC, the projection control unit 121 that causes the projecting unit 101 to project the correction pattern 177 including the markers 177*a* functioning as the first pattern and the black region 177*b* and the position markers 177*c* functioning as the second pattern, and the correction control unit 122 that detects at least a part of the markers 177*a*, the black region 177*b*, and the position markers 177*c* included in the correction pattern 177 projected by the projecting unit 101 and corrects distortion of a projected image. The correction control unit 122 detects the position markers 177*c* projected on the screen SC and detects the positions of the markers 177*a* on the basis of the positions of the detected position markers 177*c*. Consequently, it is possible to detect the position markers 177*c* from the photographed image 201, estimate the positions of the markers 177*a* from the positions of the position markers 177*c*, and promptly detect the positions of the markers 177*a*. Therefore, it is possible to reduce time required for the detection of the markers 177*a*.

For example, if the position markers 177*c* functioning as the second pattern are arranged to be easily detected, even if the markers 177*a* are not easily detected, it is possible to promptly detect the markers 177*a* and perform correction. In this case, since the markers 177*a* are not required to be formed in positions and a shape for easily detecting the markers 177*a*, it is possible to form the markers 177*a* in positions and a shape suitable for correction of an image and further improve the accuracy of the correction.

The projecting unit 101 includes the zoom lens 151. The position markers 177*c* are arranged to be projected in the vicinity of the intersection point of the optical axis of the zoom lens 151 and the screen SC.

In this case, the positions of the position markers 177*c* are less easily affected by the zoom ratio of the projector 100 and can be estimated irrespective of the positional relation between the projector 100 and the screen SC. Therefore, the projector 100 can promptly detect the position markers 177*c* from the photographed image 201.

The position markers 177*c* include a plurality of parallel lines colored in white or a color having high luminance compared with an image projected on the screen SC as a background of the correction pattern 177 or the marker 177*a*. Therefore, the projector 100 can more promptly detect the position markers 177*c* from the photographed image 201.

The position markers 177*c* are projected together with the black region 177*b*. The position markers 177*c* are formed in the color having higher luminance than the black region 177*b*. Therefore, it is possible to more easily detect the position markers 177*c*. Further, the position markers 177*c* are placed on the black region 177*b*, which is a straight line arranged to be reflected on the epipolar line 201a of the optical axis of the zoom lens 151 in the photographed image 201. Therefore, it is possible to more easily detect the position markers 177c.

The position markers 177c and the black region 177b may be arranged to be reflected in the vicinity of the epipolar line 201a in the photographed image 201. In this case, as in the case explained above, it is possible to more easily detect the position markers 177c.

In other words, the position markers 177c and the black region 177b may be arranged to be reflected in the vicinity of the optical axis of the zoom lens 151 in the photographed image 201. In this case, as in the case explained above, it is possible to more easily detect the position markers 177c.

The correction pattern 177 explained in the embodiment is only an example. It is naturally possible to use a correction pattern including a first pattern and a second pattern having shapes different from the shapes in the example explained above.

Figure 6A:
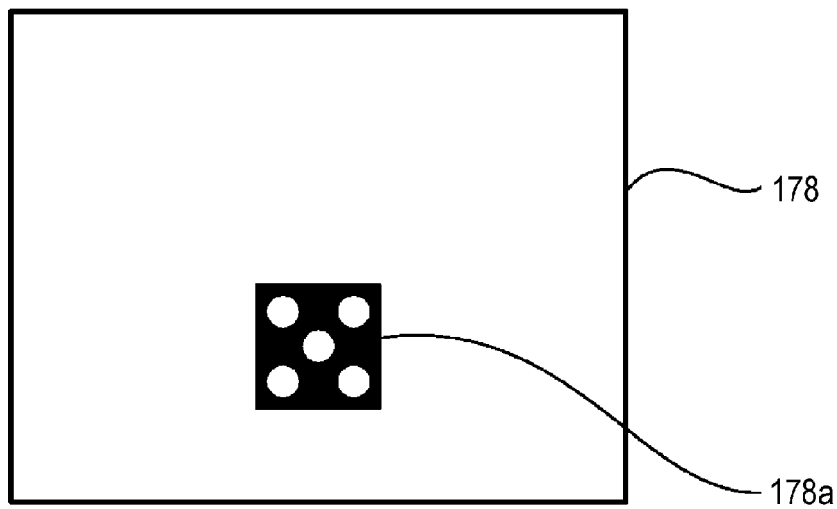
FIG. 6A is a diagram showing another example of a correction pattern, and showing an example of the correction pattern.
Figure 6B:
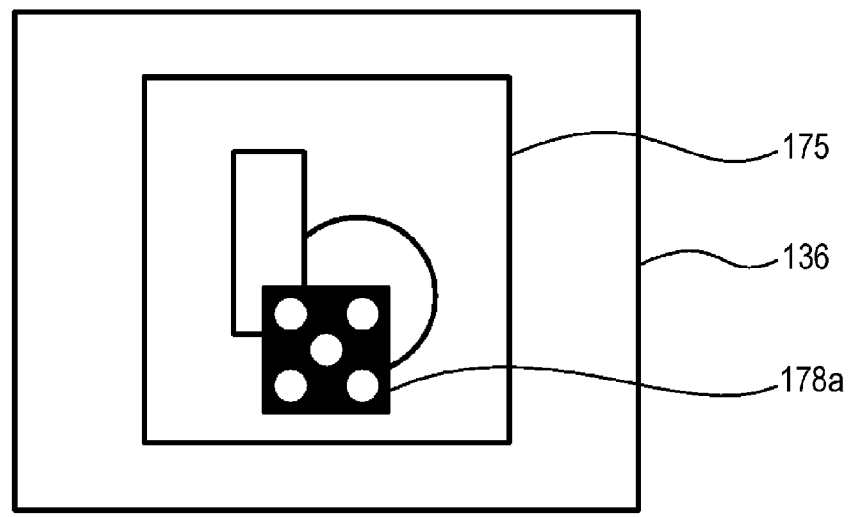
FIG. 6B is a diagram showing another example of a correction pattern, and showing an example in which the light modulation device renders an image and the correction pattern.
Figure 6C:
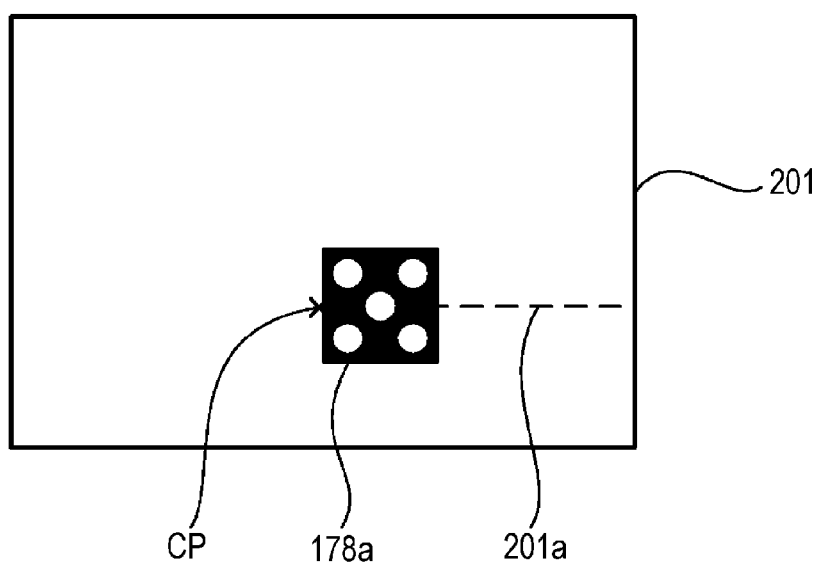
FIG. 6C is a diagram showing another example of a correction pattern, and showing an example of the photographed image.

FIGS. 6A to 6C are diagrams showing another example of a correction pattern, wherein FIG. 6A shows an example of a correction pattern 178, FIG. 6B shows an example in which the light modulation device 130 renders an image and the correction pattern 178, and FIG. 6C shows an example of a photographed image 201.

The correction pattern 178 shown in FIG. 5A includes one marker 178a (the first pattern). The marker 178a is a figure having a black color or a low luminance color and a predetermined area. In the example shown in FIG. 6A, the marker 178a is rectangular. The marker 178a includes, on the inside, a plurality of white or high-luminance figures (in this example, circles). The white or high-luminance figures are equivalent to the second pattern.

The correction pattern 178 excluding the marker 178a is transparent. Therefore, when the correction pattern 178 is rendered in the image formable region 136 to be placed on the image 175, as shown in FIG. 6B, the marker 178a is rendered to be placed on the image 175. Since the correction pattern 178 is not affected by the distortion correction processing like the correction pattern 177, a position where the marker 178a is rendered is fixed.

The marker 178a included in the correction pattern 178 is arranged in a position overlapping the epipolar line 201a in the photographed image 201 as shown in FIG. 6C. Therefore, like the position markers 177c, the marker 178a does not move according to the zoom ratio of the projector 100. Even if the projection distance from the projector 100 to the screen SC changes, the position of the marker 178a less easily fluctuates.

Therefore, if the correction control unit 122 searches through the vicinity of the epipolar line 201a in the photographed image 201, the correction control unit 122 can easily detect the high-luminance color image included in the marker 178a. Relative positions of the plurality of figures included in the marker 178a are known. Therefore, for example, it is possible to calculate a zoom ratio by detecting the plurality of circles included in the marker 178a. If the number of the plurality of circles included in the marker 178a is equal to or larger than the number of feature points necessary for the three-dimensional measurement unit 125 to perform three-dimensional measurement, it is possible to perform the three-dimensional measurement by detecting the marker 178a and calculate parameters necessary for the distortion correction processing.

Besides the correction pattern 178 illustrated in FIGS. 6A to 6C, correction patterns including various figures can be used. Like the position markers 177c, the positions of the circles included in the marker 178a in this modification only has to be the position overlapping the epipolar line 201a or the vicinity of the epipolar line 201a or the vicinity of the optical axis of the zoom lens 151. In this case, the projector 100 can easily detect the circles included in the marker 178a.

The embodiment explained above is only an example of a specific mode to which the invention is applied. The embodiment does not limit the invention. The invention can also be applied as a mode different from the embodiment. For example, in the example explained in the embodiment, the image input to the A/D conversion unit 110 via the cable 200 is projected. However, the invention is not limited to this. It is also naturally possible to apply the invention when an image or a video stored in the image storing unit 171 is projected. Setting values concerning times, thresholds, and the like for defining the operations of the units of the projector 100 in the embodiment are stored in the ROM 170 in advance. However, the setting values may be stored in a storage medium or a device on the outside of the projector 100 and acquired by the projector 100 according to necessity. The setting values may be input every time the remote controller 191 or the operation unit 195 is operated. Further, the correction patterns 177 and 178 and the like used by the projector 100 may be stored in a device or a storage medium on the outside of the projector 100. In the explanation in the embodiment, the projecting unit 101 and the image pickup unit 180 are configured to be fixed to the main body of the projector 100. However, the invention is not limited to this. If relative positions of a principal point of the zoom lens 151 and a principal point of the camera lens 183 are known and configured not to fluctuate in the series of processing shown in FIG. 5, it is possible to configure the projecting unit 101 and the image pickup unit 180 separately. In the embodiment, the processing for correcting trapezoidal distortion that occurs in an image on the screen SC is explained. However, the invention is not limited to this. For example, the invention can also be applied to, for example, processing for correcting distortion called barrel distortion or pincushion distortion.

In the explanation in the embodiment, the image pickup unit 180 includes the CCD camera 181 including a CCD image sensor. However, the invention is not limited to this. A CMOS sensor may be used as the image sensor of the image pickup unit 180. In the embodiment, the configuration including the three transmissive or reflective liquid crystal panels corresponding to the respective colors of RGB is explained as the example of the light modulation device. However, the invention is not limited to this. For example, the light modulation device may be configured by a system in which one liquid crystal panel and a color wheel are combined, a system in which three digital mirror devices (DMDs) that modulate the color lights of the RGB colors are used, or a system in which one digital mirror device and a color wheel are combined. When only one liquid crystal panel or DMD is used as a display unit, a member equivalent to a combination optical system such as a cross-dichroic prism is unnecessary. Besides the liquid crystal panel or the DMD, a configuration capable of modulating light emitted by a light source can be adopted without problems. The functional units shown in FIG. 1 indicate the functional configuration of the projector 100. A specific embodiment of the functional units is not specifically limited. In other words, hardware individually corresponding to each of the functional units does not always necessary to be mounted. It is also naturally possible to adopt a configuration in which one processor executes a program to realize functions of a plurality of functional units. A part of the functions realized by software in the embodiment may be realized by hardware. Alternatively, apart of the functions realized by hardware may be realized by software.

REFERENCE SIGNS LIST 100 projector
101 projecting unit (projecting means)
120 CPU
121 projection control unit (controlling means)
122 correction control unit (correcting means)
130 light modulation device
131 processor for images
132 trapezoidal-distortion correcting unit
133 superimposition processing unit
134 light-modulation-device driving unit
150 projection optical system
151 zoom lens (projection lens)
170 ROM
172 correction-pattern storing unit
177 correction pattern (image for adjustment)
177a markers (first pattern)
177b black region (second pattern)
177c position markers (second pattern)
180 image pickup unit (image pickup means)
183 camera lens
185 motion detecting unit
191 remote controller
195 operation unit
SC screen (projection surface)

The invention claimed is:

1. A projector comprising:
a projecting unit configured to project an image on a projection surface;
a control unit configured to cause the projecting unit to project an image for adjustment including a first pattern and a second pattern;
a correcting unit configured to detect the first pattern and the second pattern included in the image for adjustment projected by the projecting unit and correct distortion of the projected image; and
an image pickup unit configured to photograph the projection surface, wherein the correcting unit detects the first pattern from a photographed image of the image pickup unit and corrects the distortion of the projected image, wherein
the correcting unit detects the second pattern projected on the projection surface and detects the position of the first pattern on the basis of the position of the detected second pattern, and
the image for adjustment includes, as the second pattern, a figure having a predetermined shape arranged to be reflected on an epipolar line in a projecting direction of the image for adjustment or in a vicinity of the epipolar line on the photographed image of the image pickup unit.

2. The projector according to claim 1, wherein
the projecting unit includes a projection lens, and
the second pattern is arranged to be projected in a vicinity of an intersection point of an optical axis of the projection lens and the projection surface.

3. The projector according to claim 1, wherein at least a part of the second pattern includes a plurality of parallel lines colored in white or a color having high luminance compared with a color of an image projected as a background of the image for adjustment.

4. A projector comprising:
a projecting unit configured to project an image on a projection surface;
a control unit configured to cause the projecting unit to project an image for adjustment including a first pattern and a second pattern; and
a correcting unit configured to detect the first pattern and the second pattern included in the image for adjustment projected by the projecting unit and correct distortion of the projected image; and
an image pickup unit configured to photograph the projection surface,
wherein the correcting unit detects the first pattern from a photographed image of the image pickup unit and corrects the distortion of the projected image,
the correcting unit detects the second pattern projected on the projection surface and detects the position of the first pattern on the basis of the position of the detected second pattern, and
the image for adjustment includes, as the second pattern, a straight line arranged to be reflected on an epipolar line in a projecting direction of the image for adjustment or in a vicinity of the epipolar line on the photographed image of the image pickup unit.

5. A projector comprising:
a projecting unit configured to project an image on a projection surface;
a control unit configured to cause the projecting unit to project an image for adjustment including a first pattern and a second pattern;
a correcting unit configured to detect the first pattern and the second pattern included in the image for adjustment projected by the projecting unit and correct distortion of the projected image; and
an image pickup unit configured to photograph the projection surface, wherein the correcting unit detects the first pattern from a photographed image of the image pickup unit and corrects the distortion of the projected image,
wherein the correcting unit detects the second pattern projected on the projection surface and detects the position of the first pattern on the basis of the position of the detected second pattern, and
the image for adjustment includes, as the second pattern, a predetermined figure configured to be reflected in a vicinity of the optical axis of the projection lens on the photographed image of the image pickup unit.

6. A projector comprising:
a projecting unit configured to project an image on a projection surface;
a control unit configured to cause the projecting unit to project an image for adjustment including a first pattern and a second pattern; and
a correcting unit configured to detect the first pattern and the second pattern included in the image for adjustment projected by the projecting unit and correct distortion of the projected image, wherein
the correcting unit detects the second pattern projected on the projection surface and detects the position of the first pattern on the basis of the position of the detected second pattern, and
the correcting unit executes, a plurality of times, processing for correcting the distortion of the projected image until a predetermined completion condition is met after a start condition for the processing for correcting the distortion of the projected image holds.

7. A control method for a projector comprising:
controlling the projector including a projecting unit configured to project an image on a projection surface;
projecting, with the projecting unit, an image for adjustment including a first pattern and a second pattern;
detecting the first pattern and the second pattern included in the image for adjustment projected by the projecting unit and correcting distortion of the projected image;
photographing the projection surface with an image pickup unit, wherein the correcting unit detects the first pattern from a photographed image of the image pickup unit and corrects the distortion of the projected image, and
detecting the second pattern projected on the projection surface and detecting the position of the first pattern on the basis of the position of the detected second pattern,
and the image for adjustment includes, as the second pattern, a figure having a predetermined shape arranged to be reflected on an epipolar line in a projecting direction of the image for adjustment or in a vicinity of the epipolar line on the photographed image of the image pickup unit.

* * * * *